United States Patent
Löhken et al.

(10) Patent No.: US 11,353,083 B2
(45) Date of Patent: Jun. 7, 2022

(54) METHOD FOR MANUFACTURING A NOZZLE PISTON, PRODUCTION METHOD FOR A DAMPER, NOZZLE PISTON, DAMPER, PRODUCTION PLANT FOR PRODUCING A DAMPER

(71) Applicant: STABILUS GMBH, Koblenz (DE)

(72) Inventors: Lars Löhken, Linz (DE); Markus Müller, Koblenz (DE); Raphael Piroth, Koblenz (DE); Ulrich Probst, Hilscheid (DE)

(73) Assignee: STABILUS GMBH, Koblenz (DE)

( * ) Notice: Subject to any disclaimer, the term of this patent is extended or adjusted under 35 U.S.C. 154(b) by 310 days.

(21) Appl. No.: 16/486,219

(22) PCT Filed: Feb. 14, 2018

(86) PCT No.: PCT/EP2018/000060
§ 371 (c)(1),
(2) Date: Aug. 15, 2019

(87) PCT Pub. No.: WO2018/153542
PCT Pub. Date: Aug. 30, 2018

(65) Prior Publication Data
US 2020/0056674 A1 Feb. 20, 2020

(30) Foreign Application Priority Data
Feb. 24, 2017 (DE) ...................... 10 2017 001 785.9

(51) Int. Cl.
*F16F 9/32* (2006.01)
*B23K 26/08* (2014.01)
(Continued)

(52) U.S. Cl.
CPC ........ *F16F 9/3214* (2013.01); *B23K 26/0869* (2013.01); *B23K 26/36* (2013.01);
(Continued)

(58) Field of Classification Search
CPC .......... F16F 9/3214; F16F 9/19; F16F 9/3271; F16F 9/3481; F16F 9/516;
(Continued)

(56) References Cited

U.S. PATENT DOCUMENTS

| 4,595,182 A | * | 6/1986 | Freitag | ................. F16F 9/0227 267/120 |
| 6,155,499 A | * | 12/2000 | Rembold | ................ B23H 9/00 239/533.12 |

(Continued)

FOREIGN PATENT DOCUMENTS

| CN | 103527027 A | 1/2014 |
| DE | 10038971 A1 | 2/2002 |

(Continued)

OTHER PUBLICATIONS

International Search Report for PCT/EP2018/000060 dated Jan. 8, 2018.

*Primary Examiner* — Xuan Lan Nguyen
(74) *Attorney, Agent, or Firm* — Schmeiser, Olsen & Watts, LLP

(57) ABSTRACT

Provided is a method for the production of a nozzle piston for arrangement in a damping space of a damper, which contains a damping fluid, wherein the piston divides the damping space into a first fluid chamber and a second fluid chamber. Also provided is a production method with the method according to the invention for a damper. Also provided is a nozzle piston for arrangement in a damping space of a damper, which contains a damping fluid, wherein the nozzle piston can be obtained by means of ultra-short pulse lasering of the recess from a piston blank. Also provided is a damper having a nozzle piston according to the invention. Also provided is a production plant for the production of a damper having at least one ultra-short pulse (Continued)

Figure 1:
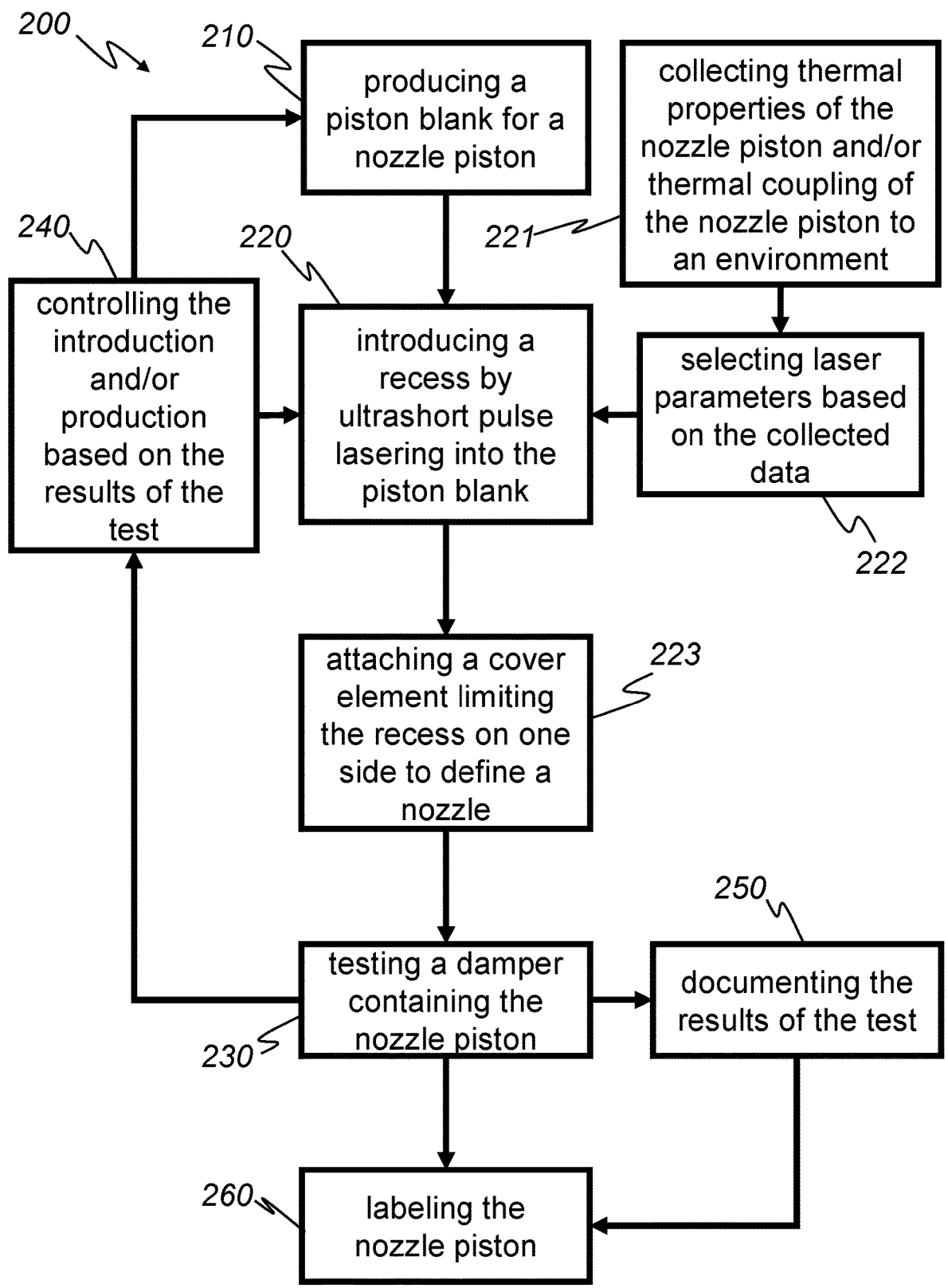

laser station for machining a piston blank for the damper by ultra-short pulse lasering.

8 Claims, 4 Drawing Sheets

(51) Int. Cl.
*B23K 26/36* (2014.01)
*F16F 9/19* (2006.01)
*F16F 9/348* (2006.01)
*F16F 9/516* (2006.01)

(52) U.S. Cl.
CPC .............. *F16F 9/19* (2013.01); *F16F 9/3271* (2013.01); *F16F 9/3481* (2013.01); *F16F 9/516* (2013.01); *F16F 2224/0208* (2013.01); *F16F 2226/023* (2013.01); *F16F 2226/04* (2013.01); *F16F 2228/066* (2013.01)

(58) Field of Classification Search
CPC ......... F16F 2224/0208; F16F 2226/023; F16F 2226/04; F16F 2228/066; B23K 26/0869; B23K 26/36; G05B 19/41805
See application file for complete search history.

(56) References Cited

U.S. PATENT DOCUMENTS

| | | | |
|---|---|---|---|
| 6,305,266 | B1 | 10/2001 | Jensen et al. |
| 6,311,813 | B1* | 11/2001 | Lauderbach .......... F16F 9/0218 188/322.16 |
| 2006/0015204 | A1 | 1/2006 | Carlstedt et al. |
| 2006/0179654 | A1 | 8/2006 | Lutz |
| 2006/0290037 | A1* | 12/2006 | Born ........................ F16F 9/48 267/120 |
| 2011/0220625 | A1 | 9/2011 | Pluss |
| 2015/0128894 | A1 | 5/2015 | Seiki |
| 2017/0028509 | A1* | 2/2017 | Ledger .................... F01D 25/18 |

FOREIGN PATENT DOCUMENTS

| | | |
|---|---|---|
| DE | 102005007010 B3 | 2/2006 |
| JP | S54149025 U | 10/1979 |
| JP | 2009291865 A | 12/2009 |
| JP | 2011200935 A | 10/2011 |
| JP | 2015086766 A | 5/2015 |
| WO | 2016/027808 A1 | 2/2016 |
| WO | 2016027808 A1 | 2/2016 |
| WO | WO2016027808 A1 | 2/2016 |

* cited by examiner

METHOD FOR MANUFACTURING A NOZZLE PISTON, PRODUCTION METHOD FOR A DAMPER, NOZZLE PISTON, DAMPER, PRODUCTION PLANT FOR PRODUCING A DAMPER

CROSS-REFERENCE TO RELATED APPLICATIONS

This application claims priority to PCT Application No. PCT/EP2018/000060, having a filing date of Feb. 14, 2018, based on German Application No. 10 2017 001 785.9, having a filing date of Feb. 24, 2017, the entire contents both of which are hereby incorporated by reference.

FIELD OF TECHNOLOGY

The following relates to a method for manufacturing of a nozzle piston for a damper.

The following further relates to a production method for a damper.

The following also relates to a nozzle piston.

The following further relates to a damper.

The following also relates to a production plant for producing a damper.

BACKGROUND

Motion dampers are often used for example in hatches, doors and compartments to dampen the opening or closing speed, for example, oil-hydraulic dampers. Due to manufacturing and components, these dampers and their speed-dependent damping force are subject to certain tolerances. In certain applications, it is desired to keep these force tolerances as small as possible, which is not always achieved using dampers of the known art.

The aforementioned dampers are often equipped with nozzle pistons which are equipped with grooves or nozzles radially or axially arranged to a damper longitudinal axis. As a result of the flow cross-section defined by the nozzles, a damping fluid, for example, a hydraulic oil or a damping gas, flows along a stroke axis when the nozzle piston is moved. In this case, the nozzles act as a bottleneck or as a throttle point, which significantly determines a flow resistance for the damping fluid. In addition to further necessary components of the damper such as pressure tube, piston rod, guide and seal package, connections and the damping fluid, the nozzle piston and in particular the design of the nozzles is significantly responsible for the adjustment of the, in particular speed-dependent, damping force and the resulting force tolerances.

A decisive disadvantage of axial nozzle pistons is the dirt sensitivity, with regard to the soiling and clogging of their nozzles. Depending on the size of the nozzle, abrasion in the device or dirt particles that enter the device during manufacture can clog up the nozzle and lead to an increase of the damping forces. In addition, adjustments with high damping forces are more difficult to realize since the axial nozzles are mainly machined into the pistons and particularly small drills have an extremely short service life.

In comparison, radial nozzle pistons, which are produced using a sintering process, have the advantage that the nozzle is manufactured by means of the sintering tool and smaller cross-sections are thus possible. This indeed makes it possible to solve the problem just described, the adjustments with higher damping forces, but this results in further disadvantages. In principle, sintered materials have a certain porosity compared to a solid material, which softens the damping force tolerance, since, depending on the porosity, more or less fluid can pass through the material with the flow resistance thus being reduced. Furthermore, the surface quality, which also has an effect on the damping force, is less easy to control with sintered materials and strongly depends on the aftertreatment of the nozzle pistons (for example, shot peening or vibratory grinding) and their process fluctuations.

Furthermore, sintering tools and tools for machining are subject to wear during use. As a result, when the tool is worn, the shape of the introduced nozzle, and thus in particular the cross-section relevant for the flow impedance and thus for the damping force, successively changes from one produced nozzle piston to the next during a production series. As a result, the reliability of the produced dampers suffers with respect to the precision of the set damping force.

The document DE 100 38 971 C2 describes a method for adjusting the throttle effect of a valve, wherein a burning off of parts by volume takes place at the valve by means of the heat development of a laser beam. A disadvantage of the method is that residual stresses and uncontrolled material deformations, in particular material elevations, which can change the throttle effect and/or must be removed by elaborate post-machining, can occur due to the impact of heat. In particular, non-relaxed residual stresses can lead to uncontrollable material changes up to cracking and material failure even a long time after laser treatment.

The document DE102005007010 (B3) describes a further method for adjusting the throttle effect of a valve. In this case, a change in shape of a valve disk is induced for adjusting its spring preload by means of the heat development of a laser beam. Again, the known disadvantages and risks of thermal processing arise.

This results in the technical problem of providing a fast, cost-efficient and easy-to-manufacture damper having an increased reliability compared to the known art and a production method and a production plant for such dampers.

SUMMARY

An aspect relates to a method for manufacturing a nozzle piston for a damper, a production method for a damper, a nozzle piston, a damper and a production plant for the production of a damper.

The method according to embodiments of the invention is used to manufacture a nozzle piston for arrangement in a damper chamber of a damper containing a damper fluid, wherein the piston divides the damper chamber into a first fluid chamber and a second fluid chamber. The method comprises at least the following steps:
a. producing a piston blank, by machining a piston base material, and
b. introducing at least one recess in the piston blank by ultrashort pulse lasering, wherein the recess defines a nozzle for the damping fluid for adapting the flow resistance for the damping fluid between the first fluid chamber and the second fluid chamber when the nozzle piston is arranged in the damper chamber.

A recess defining a nozzle enables the damping fluid to flow back and forth between the first and second fluid chambers during operation of the damper so that the piston can move in the damper chamber. The flow resistance for the damping fluid depends largely on the nozzle as a bottleneck in the flow path and thereby determines the necessary force to move the piston and thus the damping force of the damper.

The piston blank is advantageously produced by machining, for example, by turning, milling, drilling and/or grinding, since in this way a large number of possible piston geometries can be produced in a simple, inexpensive and fast manner and in particular with controllable chemical and/or mechanical surface properties. For this purpose, according to embodiments of the invention, a cleaning step, polishing step and/or coating step of the piston blank can be performed, for example, for the removal of chips or chemical residues. The removal of chips or chemical residues may occur immediately after the production of the piston blank, for example. In order to obtain such a controlled state of the piston blank regardless of the storage conditions, a number of pistons can further be stored in a packaging means and be removed from this only immediately before the further processing of the piston blank to a nozzle piston and/or under controlled environmental conditions.

To increase the production flexibility and reduce the effort of storage, a piston blank for different design types can be produced standardized, by leaving a sufficient amount of material in the piston blank, in order to manufacture each construction type-specific nozzle piston from the standardized piston blank having a corresponding construction type-specific nozzle geometry through a post-processing with, for example, an ultrashort pulse laser step. The piston blank may correspond to all nozzle pistons that can be manufactured therefrom, except for the regions of the piston blank which are to be post-processed and which define the nozzle of the nozzle piston. As a result, expensive ultrashort pulse lasering is limited to a minimum volume of material by the method, which is expensive and slow compared to, for example, machining methods. According to a guideline according to embodiments of the invention, all structures of the nozzle piston are manufactured by the most cost-efficient pre-processes, which have reduced demands on the manufacturing tolerance and/or can be standardized and/or can be post-processed by ultrashort pulse lasering.

In particular, the method according to embodiments of the invention has the advantage that the piston blank can be manufactured cost-efficiently, for example, from a solid material. The embodiments are subject to the finding that the superficial disadvantage of not producing the nozzle piston as usual in a single production step, in particular a sintering process, but using a two- or multi-step process according to embodiments of the invention, can be more than made up for by the higher production efficiency and flexibility of the overall process, in particular of sequences of lots of dampers of different series, and their higher quality and lower rejection.

In contrast to machining or sintering tools, a laser is not subject to any tool wear directly influencing the treatment result, resulting in a high reproducibility of the treatment result. Furthermore, in contrast to a sintering tool, for example, geometrically, different recesses or even undercuts can be produced in a simple manner with the same laser. As a result, a more flexible production, especially for small series, is possible at no extra cost.

Ultrashort pulse lasering provides the additional advantage that removal of material is possible without heating the surroundings of the removal region. As a result, deformations, residual stresses and/or elevations of the piston material are avoided, whereby a more precise and reproducible treatment is possible than with the commonly used methods. This allows the cost-effective and reliable manufacture of nozzles having a particularly high and consistent precision, for example, having a size tolerance according to ISO tolerance class IT5 to IT6. A precise and reproducibly manufactured nozzle ensures a precise and reproducible adjustable flow resistance for the damping fluid and thus a reliably adjustable damping behavior of the damper.

The introduction by ultrashort pulse lasering can take place at a local piston temperature in a removal region of the nozzle piston which is above a sublimation temperature of a piston base material. That is, in the removal region in which material is to be removed, the piston base material is locally and temporarily limited heated by the ultrashort pulse laser so strongly that it transitions from a solid state to the gas phase or an aerosol. This results a recess from the piston base material in the removal region. According to embodiments of the invention, the removal can be carried out under continuous suction, in order to effect the discharge of the removed material and to avoid an undesired or uncontrolled deposition of removed material on the piston.

The introduction by ultrashort pulse lasering can take place at a regional piston temperature in a piston region adjoining a removal region of the nozzle piston, which piston region is below a deformation temperature of a piston base material and corresponds to an ambient temperature of an environment of the nozzle piston. By a suitable choice of ultrashort pulse laser parameters, the regional temperature of the nozzle piston outside the removal region remains below a deformation temperature, in particular a partial melting temperature or melting temperature of the piston base material. Advantageously, no residual stresses, deformations or elevations of the piston material arise as a result. It is particularly advantageous when the regional piston temperature does not exceed the ambient temperature of the piston, so that no heating of the environment occurs through the treatment, which could interfere with the production process.

As particularly advantageous for a precise and as fast as possible introduction of a recess, for example, in a metallic solid material such as aluminum, the following ultrashort pulse laser parameters have been found:

a. a laser wavelength in the near infrared spectral range between 0.8 µm and 3.0 µm, particularly in the IR-A range between 0.8 µm and 1.4 µm, and more particularly at about 1.0 µm;
b. a pulse frequency between 200 kHz and 2000 kHz, particularly between 500 kHz and 1000 kHz, and more particularly at about 800 kHz;
c. a pulse duration of less than 100 ps, particularly less than 10 ps, and more particularly about 0.8 ps;
d. a pulse energy of less than 500 mJ, particularly less than 200 mJ and/or
e. a laser spot diameter of between 25 µm and 500 µm, particularly between 50 µm and 150 µm, and more particularly about 75 µm.

The introduction by ultrashort pulse lasering can be carried out in a controlled atmosphere, in particular in a protective gas or inert gas or a protective gas and/or inert gas mixture. Using a controlled atmosphere, it is possible, for example, to control the formation of an oxide layer on the surface of the nozzle piston in order, for example, to set frictional forces between the nozzle piston and the damping fluid or wear behavior of the nozzle piston in the region of the recess.

The method can include collecting thermal characteristics of the nozzle piston and/or a thermal coupling of the nozzle piston to an environment of the nozzle piston. For example, a deformation temperature, heat capacity and/or thermal conductivity of the piston base material and/or heat dissipation from the nozzle piston into its surroundings can be obtained from corresponding tables and/or databases for known materials and geometries. It can be determined from the thermal properties and the thermal coupling, for example, with a computer program, which energy flux is permitted to act on the nozzle piston upon introduction of the recess, without causing an excessive increase in the regional piston temperature. In turn, suitable laser parameters can be determined from the energy flow, with which an efficient material removal in the region of the recess is achieved without exceeding the maximum desired energy flow.

Thus, the method can comprise selecting laser parameters based on thermal characteristics of the nozzle piston and/or thermal coupling of the nozzle piston to surroundings of the nozzle piston in order to achieve suitable laser parameters for an efficient material removal without overheating the piston material as discussed above.

The method can comprise attaching at least one cover element adjoining the recess. The cover element can limit the recess at least on one side, so that the volume located in the region of the recess between the nozzle piston and the cover element defines a nozzle. The advantage of this is that the recess does not have to be introduced like a tunnel into the nozzle piston but can be introduced on a surface of the nozzle piston rather like a trench and then closed on one side by the cover element. As a result, the recess is easier to access during introduction and can be introduced easier, faster and cheaper. Furthermore, the flow resistance for the damping fluid flowing through the nozzle and thus the damping force of the damper can be adjusted by cover elements having different shape and/or surface quality. The attachment of a cover element thus increases the flexibility of manufacture.

The method can comprise testing the nozzle piston, for example, with respect to a force-velocity characteristic of a damper contained within the nozzle piston. Alternatively, or additionally, it is also possible to test the position, shape, size and/or surface quality of the recess, for example, by means of image recognition. To ensure that a damper with the nozzle piston shows the desired damping force depending on the movement speed of the nozzle piston relative to the damping fluid, the nozzle piston can be mounted in a damper, in particular in the damper for which the nozzle piston is intended. Then its force-speed characteristic can be measured on the mounted damper. The measurement in the mounted damper is particularly suitable when a high proportion of the manufactured nozzle pistons, in particular every manufactured nozzle piston, is to be tested, since this eliminates an additional mounting step in a test setup. As a result, a high reliability of the dampers is possible with a high-test proportion, in particular in the context of a low dispersion of the damping behavior, with at the same time low manufacture costs.

The method can comprise controlling the introduction and/or production based on a result of a testing of a nozzle piston. The controlling can achieve a closed control loop in which the possible deviations of a tested nozzle piston from its specifications for subsequently produced nozzle pistons can be corrected with an adaptation of the introduction and/or production. For example, if a too high force occurs in the force-velocity characteristics of a damper with a nozzle piston, the ultrashort pulse laser treatment can be set to a higher material removal to manufacture a larger recess, for example, by a longer treatment time. As a result, subsequent nozzle pistons are manufactured with a larger nozzle, so that the flow resistance is reduced for the damping fluid flowing through the nozzle, resulting in a lower damping force of the damper. By adapting the manufacturing by means of a closed control loop in the case of deviations of the manufactured nozzle pistons from their specifications, a very small dispersion of the damping properties of the dampers equipped with the manufactured nozzle pistons can be achieved.

The method can comprise documenting a result of a testing of the nozzle piston. Documenting, in particular in conjunction with type, production and/or material data, can reconstruct the cause of functional problems, in particular with later functional problems of a damper. As a result, possible problems in manufacture and/or raw material selection can be detected and corrected in order to increase the reliability of the manufactured nozzle pistons and the dampers produced therewith. The documenting takes place at least partially directly on the manufactured nozzle piston, for example, in the form of an alphanumeric code, a barcode and/or QR code. As a result, for example, even nozzle pistons that are otherwise difficult to distinguish from each other can be reliably identified and the attached information is always available together with the nozzle piston.

The method can comprise a labeling of the nozzle piston and/or damper, whereby information on a nozzle piston and/or damper can advantageously be documented directly on the component. The labeling may be carried out by ultrashort pulse lasering, in particular in the same process step as the introduction of the recess. This enables a particularly efficient manufacture.

The method can comprise hardening a surface of the nozzle piston. Hardening the surface can reduce the wear of the nozzle piston, in particular in heavily used areas such as the nozzles or contact surfaces to the damper chamber. As a result, a higher reliability of the nozzle piston and damper is achieved. The hardening may be carried out by ultrashort pulse lasering, in particular in the same process step as the introduction of the recess. This enables a particularly efficient manufacture. Depending on the piston material, other laser parameters are generally required for hardening than for introducing the recess, since, for example, an energy input over a larger area is necessary.

The method can comprise coating a surface of the nozzle piston. In particular, the application of a wear protection layer can, for example, in high-stress regions such as the nozzles or contact surfaces for the damper chamber, increase the longevity and reliability of the nozzle piston and thus the damper.

The production method for a damper according to embodiments of the invention comprises at least the following steps:

a. manufacturing a nozzle piston using a method according to embodiments of the invention and
b. installing the nozzle piston in a damper chamber of the damper, wherein the piston is guided along a longitudinal axis of the damper chamber and divides the damper chamber into a first fluid chamber and a second fluid chamber.

If the nozzle piston is installed as described, it thereby provides, for the damper, the advantages according to embodiments of the invention. The installation can be carried out by customary methods, so that the method according to embodiments of the invention can be smoothly and cost-effectively incorporated into existing manufacturing processes.

A nozzle piston according to embodiments of the invention is provided for arrangement in a damper chamber of a damper containing a damping fluid, wherein the nozzle piston divides the damper chamber into a first fluid chamber and a second fluid chamber, wherein the nozzle piston has at least one recess, wherein the recess defines a nozzle for the damping fluid for adapting the flow resistance for the damping fluid between the first fluid chamber and the second fluid chamber.

The nozzle piston is obtainable by ultrashort pulse lasering of the recess, in particular using a method according to embodiments of the invention, from a piston blank.

The piston can consist of a sintered material or of a solid material. The piston consists of a solid material. A piston made of solid material is more controllable and can be manufactured with less manufacturing tolerance than, for example, a porous material made from a sintering process and, at the same time, is less likely to release particles that could plug bottlenecks, particularly in a nozzle. This increases the reliability of a damper with a nozzle piston according to embodiments of the invention. An advantage of the material properties of the nozzle piston according to embodiments of the invention which can be selected with a higher degree of freedom, is that it is better optimizable than a nozzle piston made of the same material produced by a sintering process, because further parameters are adjustable. For example, the parameter thermal conductivity can be higher in the case of a solid material than in the case of a sintered material, which results in a more efficient heat removal of the sections of the nozzle piston which are strongly heated by friction during damping operation. The optimization can, for example, lie with a freer adjustability of parameters such as thermal conductivity, mechanical stability, dimensional stability, wear, in particular of the sections particularly stressed due to fluid flow and/or stressed mechanically, such as the nozzles.

A nozzle piston obtainable by means of ultrashort pulse lasering of the recess is in particular characterized by that the nozzle piston, in contrast to conventional methods for introducing a recess, is free from thermally induced deformations, residual stresses and/or material elevations in a region of the recess. This results in the advantages mentioned for the method according to embodiments of the invention.

The nozzle piston can have a piston longitudinal axis, which is provided for arrangement parallel to a longitudinal axis of the damper chamber. The recess can substantially define a radial nozzle in a radial direction orthogonal to the piston longitudinal axis. Radial nozzles have the advantage that smaller flow cross-sections and thus higher flow resistance and damping forces can be realized than with axial nozzles. This opens up additional application areas with high damper loads, so that dampers with radial nozzle pistons can be used more flexibly. Particularly advantageously, a radial nozzle is located in a web extending, particularly annularly extending, around the piston longitudinal axis. Due to the arrangement in such a web, only a small material removal for introducing the nozzle is necessary, so that it can be produced quickly and inexpensively.

The recess can define an axial nozzle along the piston longitudinal axis. The damping fluid can flow through the nozzle piston substantially in a straight line through an axial nozzle. Due to the simpler flow geometry than with a radial nozzle, the flow behavior and thus the damping behavior can be calculated more easily in advance, so that fewer expensive tests for the development of new dampers are necessary. In addition, an axial nozzle piston does not require any additional deflecting elements to direct the damping fluid flow from an axial to a radial direction and back, so that an axial nozzle piston can be of particularly simple and inexpensive construction.

The nozzle piston can, in particular in a piston region adjoining the recess, comprise a cover element which delimits the recess at least on one side. The cover element can for example be designed as a disk, in particular perforated disk, and/or be fastened to the nozzle piston, in particular detachably. The cover element can, for example, be glued, welded, screwed, riveted and/or pressed to the nozzle piston. The cover element allows, on the one hand, the advantages mentioned in the method according to embodiments of the invention in manufacturing. On the other hand, a detachably fastened cover element, for example, for maintenance and/or cleaning of the nozzle piston can be released from the nozzle piston, so that the nozzle defined by the recess for cleaning and/or maintenance work is easily accessible. In particular, the cover element can be connected to the nozzle piston such that it is at least temporarily removed from the damping piston in a damping operation of a damper equipped with the nozzle piston by the movement of the damping fluid. This allows possible contaminants to be flushed out of the nozzle by the damping fluid so that the nozzle is automatically cleaned during operation of the damper. A simple, in particular automatic, cleaning and/or easy maintenance increases the service life and reliability of the nozzle piston and the damper.

The nozzle piston can, in particular in a piston region adjoining the recess, be free from residual stresses and/or material elevations, comprise a smooth surface, in particular a smoother surface than in a conventional nozzle piston made of a sintered material; comprise a structured surface for adjusting a thermal coupling and/or a frictional resistance of the damping fluid with respect to the surface; have a surface hardened with respect to a piston base material surface and/or comprise a coating. For the advantages and possible embodiments of the features mentioned in this paragraph, reference is made to the corresponding statements on the method according to embodiments of the invention.

The recess can define a three-dimensional shape of the nozzle, wherein the shape is configured for adjusting the flow resistance and/or a heat dissipation of the damping fluid. The flow resistance can be adjusted, for example, by means of the area and/or shape of a flow cross-section of the nozzle for the damping fluid.

The recess can comprise at least one widening and/or a tapering of a flow cross-section for the damping fluid. A targeted arrangement of tapers and/or curves, at which the damping fluid is braked, for example, can adjust the local heat dissipation, for example to distribute the heat dissipation over the largest possible area of the nozzle piston and thus to prevent a too high local thermal stress of the nozzle piston.

In particular, for reasons of simple and rapid producibility, the recess can comprise a substantially rectangular and/or trapezoidal flow cross-section for the damping fluid. Ultrashort pulse lasering makes it possible to introduce broad and flat recesses into the damping piston, particularly fast and simple in terms of processing. In addition to a rectangular flow cross-section, non-rectangular geometries, for example, having a flank angle of 20° to 30°, and/or undercuts can also be advantageous.

The damper according to embodiments of the invention comprises a damping space for receiving a damping fluid and a nozzle piston according to embodiments of the invention guided along a longitudinal axis of the damping space in the damping space wherein the nozzle piston divides the damping space into a first fluid chamber and a second fluid chamber. A damper according to embodiments of the invention is distinguished over the known art by the advantages described in conjunction with the nozzle piston according to embodiments of the invention, in particular a higher reliability and flexibility with lower production costs.

A production plant according to embodiments of the invention for producing a damper, in particular a damper according to embodiments of the invention, in particular by a production method according to embodiments of the invention, comprises at least one ultrashort pulse laser station for treatment of a piston blank for the damper by ultrashort pulse lasering. The ultrashort pulse laser station can comprise at least one ultrashort pulse laser and the supply and/or control means necessary for, in particular automatic, operation of the ultrashort pulse laser. The ultrashort pulse laser station can comprise a suction device for suction of substances released in the ultrashort pulse laser treatment. A production plant according to embodiments of the invention can implement the advantages already shown with the production method and damper according to embodiments of the invention.

The ultrashort pulse laser station can be assignable to a plurality of production lines of the production plant. Different production lines can, for example, produce differently designed dampers. This has the advantage that investment and maintenance costs for the ultrashort pulse laser station incur only once for the plurality of production lines, thereby enabling more cost-efficient production. Since an ultrashort pulse laser, in contrast to a sintering tool, can be adjusted quickly and easily to different treatment geometries, an assignment of a treatment station to a plurality of production lines can be realized particularly advantageously using a laser treatment station.

The ultrashort pulse laser station can in particular be designed to be mobile in order, for example, to travel to different production lines on an undercarriage, in particular a motorized one, as required. Alternatively, or additionally, the production plant can comprise a transport system for supplying piston blanks from a plurality of production lines to the ultrashort pulse laser station. For example, the transport system can comprise a conveyor belt and/or a switch guide to guide piston blanks from different production lines to the ultrashort pulse laser station. In addition, the transport system and/or a further transport system can also be designed to supply nozzle pistons processed by the ultrashort pulse laser station to a further processing.

The ultrashort pulse laser station can be integrated into a transport system for transporting piston blanks. As a result, the piston blanks can be machined in a particularly time-efficient manner during transport by the ultrashort pulse laser station.

The ultrashort pulse laser station can comprise a laser scanner. With the aid of a laser scanner, a laser beam from the ultrashort pulse laser station can be scanned over a surface of the piston blank, so that the surface of the piston blank can be machined without having to move the piston blank therefor. Therefore, a movable, in particular multiaxially-movable piston holder is not necessary for the movable mounting of the piston blank during ultrashort pulse laser treatment. As a result, the production plant can be constructed and operated in a cost-effective manner.

The production plant can comprise at least one production station upstream of the ultrashort pulse laser station in the course of production for producing a piston blank from a piston base material. Due to the integration of the production station, the production of the piston blank and its ultrashort laser treatment can be advantageously coordinated with each another. For example, the piston blank can already be preprocessed during production to such an extent that the following ultrashort laser treatment can take place in a time span which does not slow down the overall production process. The production station can comprise customary, in particular automated, machines for producing nozzle pistons, for example, lathes, milling machines and/or drilling machines.

The production plant can comprise at least one control unit for controlling the ultrashort pulse laser station, a production station and/or a transport system and/or for documenting production parameters, in particular of the ultrashort pulse laser station and/or a production station, and/or test results of a test station. The control unit can, for example comprise a computer device, in particular a computer and/or a programmable logic controller, communicatively connected to the ultrashort pulse laser station, a production station and/or a transport system. The control unit can control the production plant particularly efficiently in terms of cost and time. Furthermore, relevant production parameters, in particular in connection with type data and/or test results of the produced dampers can be documented for quality assurance in order to increase the reliability of the produced dampers.

The production plant can comprise at least one testing station downstream of the ultrashort pulse laser station in the course of production for testing the nozzle piston and/or the damper, wherein the testing station comprises a transmission unit for transmitting results of the test to a control unit. A testing station integrated in the production plant makes it possible to check very quickly whether the produced nozzle pistons and/or dampers meet their respective specifications. For example, the force-velocity characteristics of a damper can be tested immediately after its mounting. In the event of deviations from the specifications, the production can be corrected by means of feedback via a control unit, for example, to a production station and/or the ultrashort pulse laser station, in particular also during the ongoing production process, so that subsequently produced nozzle pistons and/or dampers meet their specifications.

The production plant can comprise at least one installation station downstream of the ultrashort pulse laser station in the course of production for installation of the nozzle piston in the damper. The installation station can be upstream or downstream of a test station in the course of production, depending on whether the test of the nozzle piston is to be done alone or installed in the damper. The latter has the advantage that the test also detects possible problems with installation due to test results deviating from a specification. Furthermore, it eliminates an additional installation and disassembly of the nozzle piston on a test setup and/or an additional test of the finished assembled damper. By contrast, a test of the nozzle piston not installed in the damper makes it easier to search for the cause of test results deviating from a specification.

BRIEF DESCRIPTION

Figure 2:
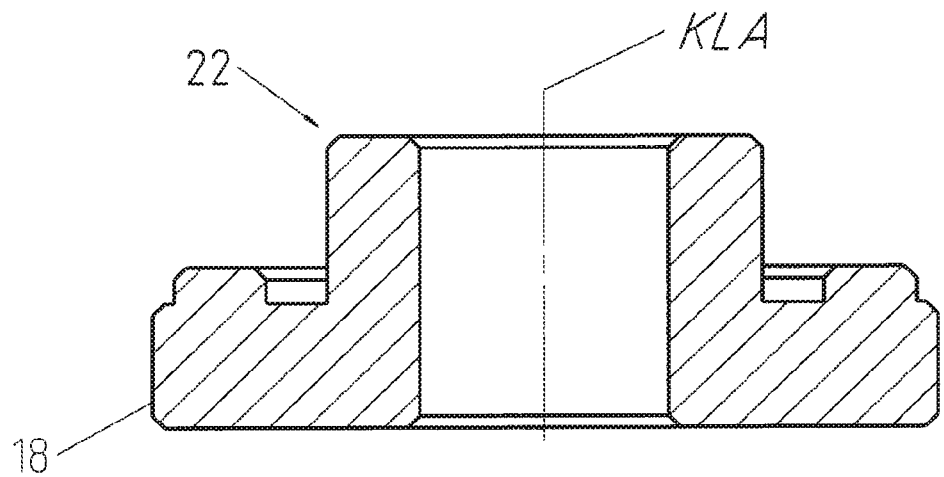
Figure 3:
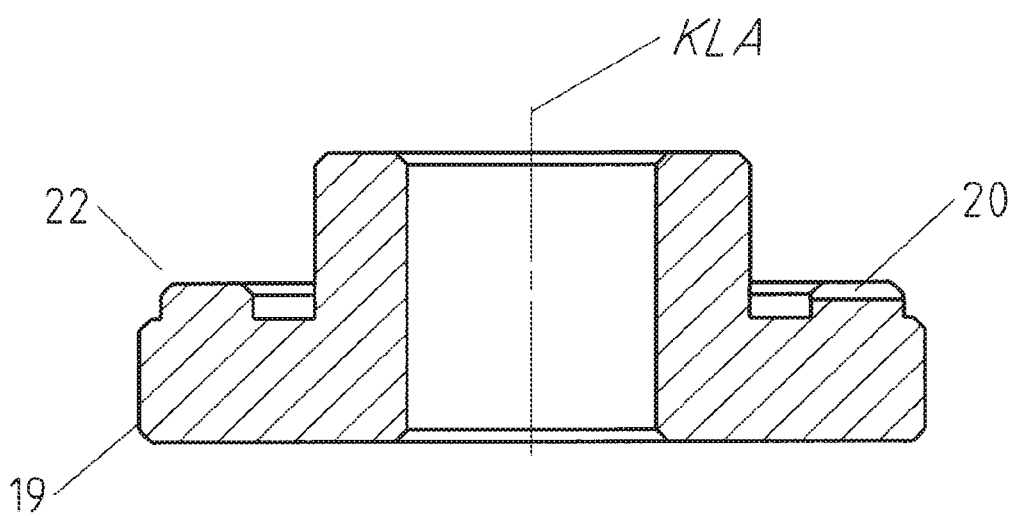
Figure 4:
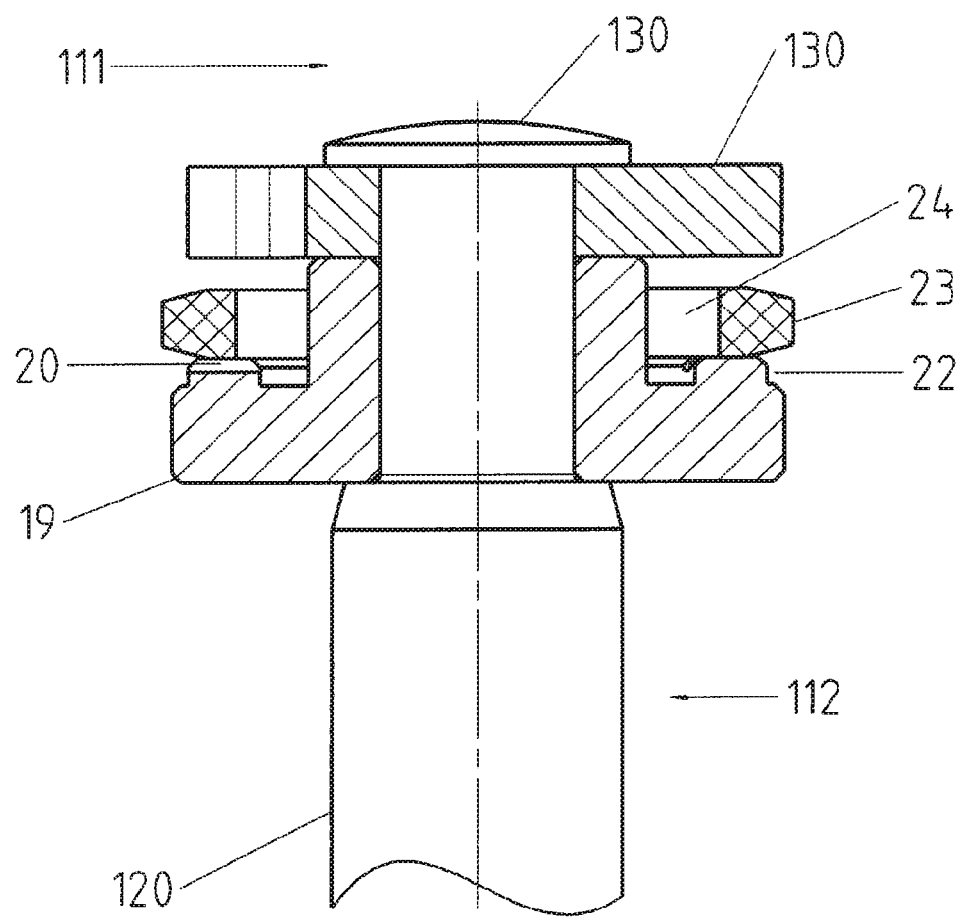
Figure 5:
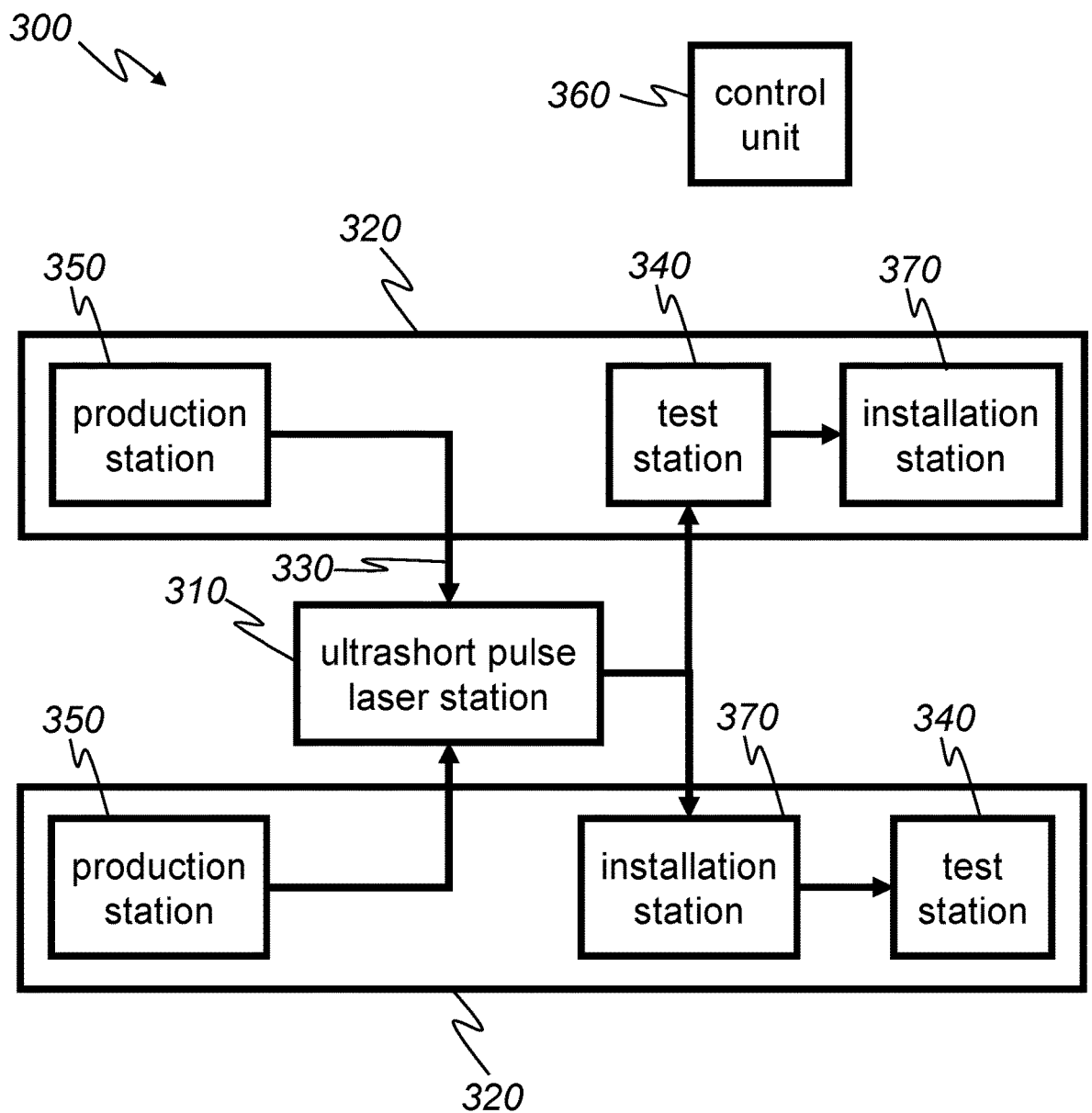

Some of the embodiments will be described in detail, with references to the following Figures, wherein like designations denote like members, wherein:

FIG. 1 a schematic representation of a method according to embodiments of the invention;

FIG. 2 a schematic longitudinal section of a piston blank for producing a nozzle piston according to embodiments of the invention;

FIG. 3 a schematic longitudinal section of a nozzle piston according to embodiments of the invention;

FIG. 4 a schematic longitudinal section of a piston rod mounted on a nozzle piston according to embodiments of the invention; and FIG. 5 a schematic representation of a production plant according to embodiments of the invention.

DETAILED DESCRIPTION

FIG. 1 shows a schematic representation of a method 200 according to embodiments of the invention. The illustrated method 200 comprises producing 210 a piston blank, for example, from a solid material and/or in a machining method. Thereafter, an introducing 220 of at least one recess takes place, which defines a nozzle, by ultrashort pulse lasering into the piston blank. For a given combination of piston material, piston geometry, and geometry and location of the recesses, a one-time collection 221 of thermal characteristics of the nozzle piston and/or thermal coupling of the nozzle piston to an environment of the nozzle piston and a selecting 222 of laser parameters based on the collected data can occur. As a result, suitable laser parameters for ultrashort pulse lasering can be obtained, which allow efficient removal of material without excessive thermal stress on the nozzle piston. Following the introduction 220 of the recess, the attachment 223 of a cover element limiting the recess at least on one side can take place so that the volume defined by the recess with the cover element constitutes a nozzle for the damping fluid. Subsequently, there may follow the testing 230 of the nozzle piston and/or a damper contained the nozzle piston, in particular with respect to a speed-dependent damping force. The method 200 can comprise controlling 240 the production 210 and/or the introduction 220, in particular using the results of the test 230 in a closed control loop. The method 200 can further comprise documenting 250 the results of the testing 230, process parameters, material parameters, and/or type data of a manufactured nozzle piston, for example, by labeling 260 the nozzle piston and/or the damper.

FIG. 2 shows a schematic longitudinal section of a piston blank 18 for manufacturing a nozzle piston 19 according to embodiments of the invention. The piston blank 18 is formed rotation-symmetrical about a piston longitudinal axis KLA and for example, manufactured by turning from a solid material. The illustrated piston blank 18 has a peripheral web 22 in the form of a cylinder ring on an end face.

FIG. 3 shows a schematic longitudinal section of a nozzle piston 19 according to embodiments of the invention. The nozzle piston 19 can be manufactured, for example, by introducing a recess 20 by ultrashort pulse lasering from the piston blank 18 shown in FIG. 2. In the illustrated example, the recess 20 is located in the circumferential web 22 and thereby defines a radial nozzle which can be flown through by a damping fluid in a radial direction orthogonal to the piston longitudinal axis KLA. A plurality of, for example, two, three, four or more recesses 20 is also conceivable on a nozzle piston 19 according to embodiments of the invention, which recesses can be distributed in particular uniformly around the piston longitudinal axis KLA to thereby ensure the most uniform loading of the nozzle piston 19 during operation and thus a high reliability.

FIG. 4 shows a schematic longitudinal section of a nozzle piston 19 according to embodiments of the invention mounted to a piston rod 120. The illustrated nozzle piston 19 comprises a cover element 23, for example, in the form of a perforated disk, which bears against the recess 20 of the nozzle piston 19 such that the volume between the nozzle piston 19 and the cover element 23 defines a radial nozzle for a damping fluid in the region of the recess 20. In operation, the nozzle piston 19 is arranged in the damper chamber (not shown) of a damper such that the nozzle piston 19 divides the damper chamber into a first fluid chamber 111 and a second fluid chamber 112. In this case, the damping fluid contained in the damper chamber, for example, can flow from the first fluid chamber 111 through an opening 24 of the cover element 23 to an inner side of the circumferential web 22. From there, the damping fluid can flow through the recess 20 to an outer side of the circumferential web 22 and further past the nozzle piston 19 into the second fluid chamber 112. The damping fluid can also flow back in the same way. The nozzle piston 19 and the cover element 23 are fastened to the piston rod 120 with a number of fastening elements 130, for example, at least one screw and one washer. The fastening is designed in the illustrated example so that the damping fluid, when it flows from the second fluid chamber 112 to the first fluid chamber 111, can lift the cover element 23 off the nozzle piston 19. As a result, a flow cross-section of the nozzle defined by the recess 20 and the cover element 23 increases, so that possible contaminants can be flushed out of the nozzle.

FIG. 5 shows a schematic representation of a production plant 300 according to embodiments of the invention. The production plant shown comprises two production lines 320, for example, for the production of dampers differing in their damping behavior. Each illustrated production line 320 comprises a production station 350 for producing a piston blank. Furthermore, the production plant comprises at least one transport system 330 (represented by arrows and labeled only by way of example) for transporting the piston blanks from both production lines 320 to a common ultrashort pulse laser station 310 at which the piston blanks are machined by ultrashort pulse lasering into nozzle pistons. The transport system 330 further serves to supply the nozzle pistons in their respective production lines 320 to a test station 340 and an installation station 370 for installation of the nozzle piston into a damper. The installation station 370 in this case can be upstream or downstream of the test station 340, depending on whether the test of the nozzle piston is to be performed installed in the damper or not. The illustrated production plant 300 comprises a central control unit 360 for controlling the production plant 300.

Although the invention has been illustrated and described in greater detail with reference to the preferred exemplary embodiment, the invention is not limited to the examples disclosed, and further variations can be inferred by a person skilled in the art, without departing from the scope of protection of the invention.

For the sake of clarity, it is to be understood that the use of "a" or "an" throughout this application does not exclude a plurality, and "comprising" does not exclude other steps or elements.

LIST OF REFERENCE CHARACTERS 18 piston blank
19 nozzle piston
20 recess
21 piston region
22 web
23 cover element
111 first fluid chamber
112 second fluid chamber
120 piston rod
130 fastening element
200 method 210 producing
220 introducing
221 collecting
222 selecting
223 attaching
230 testing
240 controlling
250 documenting
260 labeling
300 production plant
310 ultrashort pulse laser station
320 production line
330 transport system
340 testing station
350 production station
360 control unit
370 installation station
KLA piston longitudinal axis

The invention claimed is:

1. A method for producing a damper, the method comprising at least the following steps:
 a. producing a piston blank,
 b. introducing at least one recess into the piston blank by ultrashort pulse lasering, wherein the at least one recess, upon arrangement of a nozzle piston in a damper chamber, defines a nozzle for a damping fluid for adapting the flow impedance for the damping fluid between a first fluid chamber and a second fluid chamber,
 c. installing the nozzle piston in the damper chamber of the damper, wherein the nozzle piston is guided along a longitudinal axis of the damper chamber and divides the damper chamber into the first fluid chamber and the second fluid chamber,
 d. testing the nozzle piston, with respect to a force-velocity characteristic of the damper containing the nozzle piston, and
 e. controlling the step of introducing the at least one recess into a subsequently produced piston blank based on a result of the step of testing of the nozzle piston.

2. The method according to claim 1, wherein the introduction by ultrashort pulse lasering:
 a. is performed at a local piston temperature in a removal region of the nozzle piston, which piston temperature is above a sublimation temperature of a piston base material; and/or
 b. is performed at a regional piston temperature in a piston region adjoining a removal region of the nozzle piston, which is below a deformation temperature of a piston base material and corresponds to an ambient temperature of an environment of the nozzle piston; and/or
 c. is performed using a laser wavelength in the near infrared spectral range between 0.8 µm and 3.0 µm; and/or
 d. is performed using a pulse frequency between 200 kHz and 2000 kHz; and/or
 e. is performed using a pulse duration of less than 100 picoseconds; and/or
 f. is performed using a pulse energy of less than 500 mJ; and/or
 g. is performed using a laser spot diameter of between 25 µm and 500 µm, and/or
 h. is performed in a controlled atmosphere.

3. The method according to claim 1, wherein at least one of the following steps is performed:
 a. collecting thermal properties of the nozzle piston and/or thermal coupling of the nozzle piston to an environment of the nozzle piston; and/or
 b. selecting laser parameters based on thermal characteristics of the nozzle piston and/or thermal coupling of the nozzle piston to an environment of the nozzle piston; and/or
 c. attaching at least one cover element adjacent to the recess; and/or
 d. documenting a result of a testing of the nozzle piston on the nozzle piston; and/or
 e. labeling of the nozzle piston and/or the damper by ultrashort pulse lasering; and/or
 f. hardening a surface of the nozzle piston by ultrashort pulse lasering, and/or
 g. coating a surface of the nozzle piston.

4. A production plant for producing a damper, with a production method according to claim 1, including
 a. at least one ultrashort pulse laser station for treatment of a piston blank for the damper by ultrashort pulse lasering,
 b. at least one control unit for controlling the ultrashort pulse laser station,
 c. at least one testing station downstream of the ultrashort pulse laser station in the course of production for testing the nozzle piston and/or the damper, wherein the at least one testing station comprises a transmitting unit, for transmitting results of the testing to the at least one control unit, and
 d. at least one installation station downstream in the course of production of the ultrashort pulse laser station for installation of the nozzle piston in the damper.

5. The production plant according to claim 4, wherein the ultrashort pulse laser station:
 a. is assigned to a plurality of production lines of the production plant, wherein the ultrashort pulse laser station is formed mobile and/or the production plant comprises a transport system for supplying piston blanks from a plurality of production lines to the ultrashort pulse laser station; and/or
 b. is integrated into a transport system for transporting piston blanks; and/or
 c. comprises a laser scanner.

6. The production plant according to claim 4, further comprising:
 a. at least one production station upstream of the ultrashort pulse laser station in the course of production for producing a piston blank from a piston base material; and/or
 b. at least one control unit for controlling a production station and/or a transport system and/or for documenting production parameters, of the ultrashort pulse laser station and/or a production station, and/or test results of a testing station.

7. The method according to claim 2, wherein the introduction by ultrashort pulse lasering:
 a. is performed using a laser wavelength in the IR-A range between 0.8 µm and 1.4 µm; and/or
 b. is performed using a pulse frequency between 500 kHz and 1000 kHz; and/or
 c. is performed using a pulse duration of less than 10 picoseconds; and/or
 d. is performed using a pulse energy of less than 200 mJ; and/or
 e. is performed using a laser spot diameter of between 50 µm and 150 µm.

8. The method according to claim 7, wherein the introduction by ultrashort pulse lasering:
   a. is performed using a laser wavelength in the IR-A range at 1.0 μm; and/or
   b. is performed using a pulse frequency at 800 kHz; and/or
   c. is performed using a pulse duration of 0.8 picoseconds; and/or
   d. is performed using a laser spot diameter at 75 μm.

\* \* \* \* \*